US012706724B2

(12) United States Patent
Kumar et al.

(10) Patent No.: US 12,706,724 B2
(45) Date of Patent: Aug. 11, 2026

(54) RADIO LINK CONTROL FOR MIXED NUMEROLOGY STANDALONE CARRIER AGGREGATION

(71) Applicant: QUALCOMM Incorporated, San Diego, CA (US)

(72) Inventors: Akshay Kumar, San Diego, CA (US); Arnaud Meylan, San Diego, CA (US); Ozcan Ozturk, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 550 days.

(21) Appl. No.: 17/937,891

(22) Filed: Oct. 4, 2022

(65) Prior Publication Data

US 2023/0139331 A1 May 4, 2023

Related U.S. Application Data

(60) Provisional application No. 63/263,329, filed on Oct. 29, 2021.

(51) Int. Cl.
*H04L 5/00* (2006.01)
*H04W 72/0453* (2023.01)
(Continued)

(52) U.S. Cl.
CPC ....... *H04L 5/0094* (2013.01); *H04W 72/0453* (2013.01); *H04W 76/15* (2018.02); *H04W 80/02* (2013.01)

(58) Field of Classification Search
CPC ..... H04L 5/0094; H04L 5/001; H04L 5/0098; H04L 47/34; H04W 72/0453; H04W 76/15; H04W 80/02
See application file for complete search history.

(56) References Cited

U.S. PATENT DOCUMENTS

2018/0324642 A1* 11/2018 Yu ..................... H04W 36/0055
2018/0352601 A1* 12/2018 Park .................... H04W 72/569
(Continued)

FOREIGN PATENT DOCUMENTS

EP 3589009 A1 1/2020
EP 3606274 A1 2/2020
WO 2019212165 A1 11/2019

OTHER PUBLICATIONS

ETSI TS 138 322 V16.1.0 (Year: 2020).*
International Search Report and Written Opinion—PCT/US2022/077580—ISA/EPO—Jan. 24, 2023.

*Primary Examiner* — Nicholas A Jensen
*Assistant Examiner* — Yonghong Zhao
(74) *Attorney, Agent, or Firm* — Harrity & Harrity, LLP

(57) ABSTRACT

Various aspects of the present disclosure generally relate to wireless communication. In some aspects, a wireless communication device may establish a first carrier of a carrier aggregation (CA) configuration, wherein the first carrier is associated with a first configuration. The wireless communication device may establish a second carrier of the CA configuration, wherein the second carrier is associated with a second configuration different than the first configuration. The wireless communication device may receive information indicating a first set of radio link control (RLC) parameters for the first configuration and a second set of RLC parameters for the second configuration. The wireless communication device may perform an RLC function for a first communication on the first carrier using the first set of RLC parameters and for a second communication on the second carrier using the second set of RLC parameters. Numerous other aspects are described.

30 Claims, 10 Drawing Sheets

(51) Int. Cl.

| | |
|---|---|
| ***H04W 76/15*** | (2018.01) |
| *H04W 80/02* | (2009.01) |

(56) References Cited

U.S. PATENT DOCUMENTS

| | | | | |
|---|---|---|---|---|
| 2019/0268799 | A1* | 8/2019 | Hong | H04W 4/70 |
| 2019/0373672 | A1* | 12/2019 | Kim | H04L 1/1642 |
| 2019/0387535 | A1 | 12/2019 | Kim | |
| 2020/0100235 | A1* | 3/2020 | Jo | H04W 80/02 |
| 2020/0252330 | A1 | 8/2020 | Wei et al. | |
| 2021/0258109 | A1* | 8/2021 | Cho | H04L 1/1642 |
| 2022/0046472 | A1* | 2/2022 | Jin | H04W 28/065 |
| 2022/0256645 | A1* | 8/2022 | Yi | H04W 28/06 |
| 2023/0041726 | A1* | 2/2023 | Yi | H04W 28/02 |

* cited by examiner

1000

RADIO LINK CONTROL FOR MIXED NUMEROLOGY STANDALONE CARRIER AGGREGATION

CROSS-REFERENCE TO RELATED APPLICATION

This patent application claims priority to U.S. Provisional Patent Application No. 63/263,329, filed on Oct. 29, 2021, entitled "RADIO LINK CONTROL FOR MIXED NUMEROLOGY STANDALONE CARRIER AGGREGATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for radio link control for mixed numerology standalone carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include establishing a first carrier of a carrier aggregation (CA) configuration, wherein the first carrier is associated with a first configuration. The method may include establishing a second carrier of the CA configuration, wherein the second carrier is associated with a second configuration different than the first configuration. The method may include receiving information indicating a first set of radio link control (RLC) parameters for the first configuration and a second set of RLC parameters for the second configuration. The method may include performing an RLC function for a first communication on the first carrier using the first set of RLC parameters. The method may include performing the RLC function for a second communication on the second carrier using the second set of RLC parameters.

Some aspects described herein relate to a wireless communication device for wireless communication. The wireless communication device may include a memory and one or more processors coupled to the memory. The one or more processors may be configured to establish a first carrier of a CA configuration, wherein the first carrier is associated with a first configuration. The one or more processors may be configured to establish a second carrier of the CA configuration, wherein the second carrier is associated with a second configuration different than the first configuration. The one or more processors may be configured to receive information indicating a first set of RLC parameters for the first configuration and a second set of RLC parameters for the second configuration. The one or more processors may be configured to perform an RLC function for a first communication on the first carrier using the first set of RLC parameters. The one or more processors may be configured to perform the RLC function for a second communication on the second carrier using the second set of RLC parameters.

Some aspects described herein relate to a non-transitory computer-readable medium that stores a set of instructions for wireless communication by a wireless communication device. The set of instructions, when executed by one or more processors of the wireless communication device, may cause the wireless communication device to establish a first carrier of a CA configuration, wherein the first carrier is associated with a first configuration. The set of instructions, when executed by one or more processors of the wireless communication device, may cause the wireless communication device to establish a second carrier of the CA configuration, wherein the second carrier is associated with a second configuration different than the first configuration. The set of instructions, when executed by one or more processors of the wireless communication device, may cause the wireless communication device to receive information indicating a first set of RLC parameters for the first configuration and a second set of RLC parameters for the second configuration. The set of instructions, when executed by one or more processors of the wireless communication device, may cause the wireless communication device to perform an RLC function for a first communication on the first carrier using the first set of RLC parameters. The set of instructions, when executed by one or more processors of the wireless communication device, may cause the wireless communication device to perform the RLC function for a second communication on the second carrier using the second set of RLC parameters.

Some aspects described herein relate to an apparatus for wireless communication. The apparatus may include means for establishing a first carrier of a CA configuration, wherein the first carrier is associated with a first configuration. The apparatus may include means for establishing a second carrier of the CA configuration, wherein the second carrier is associated with a second configuration different than the first configuration. The apparatus may include means for receiving information indicating a first set of RLC parameters for the first configuration and a second set of RLC parameters for the second configuration. The apparatus may include means for performing an RLC function for a first communication on the first carrier using the first set of RLC parameters. The apparatus may include means for performing the RLC function for a second communication on the second carrier using the second set of RLC parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
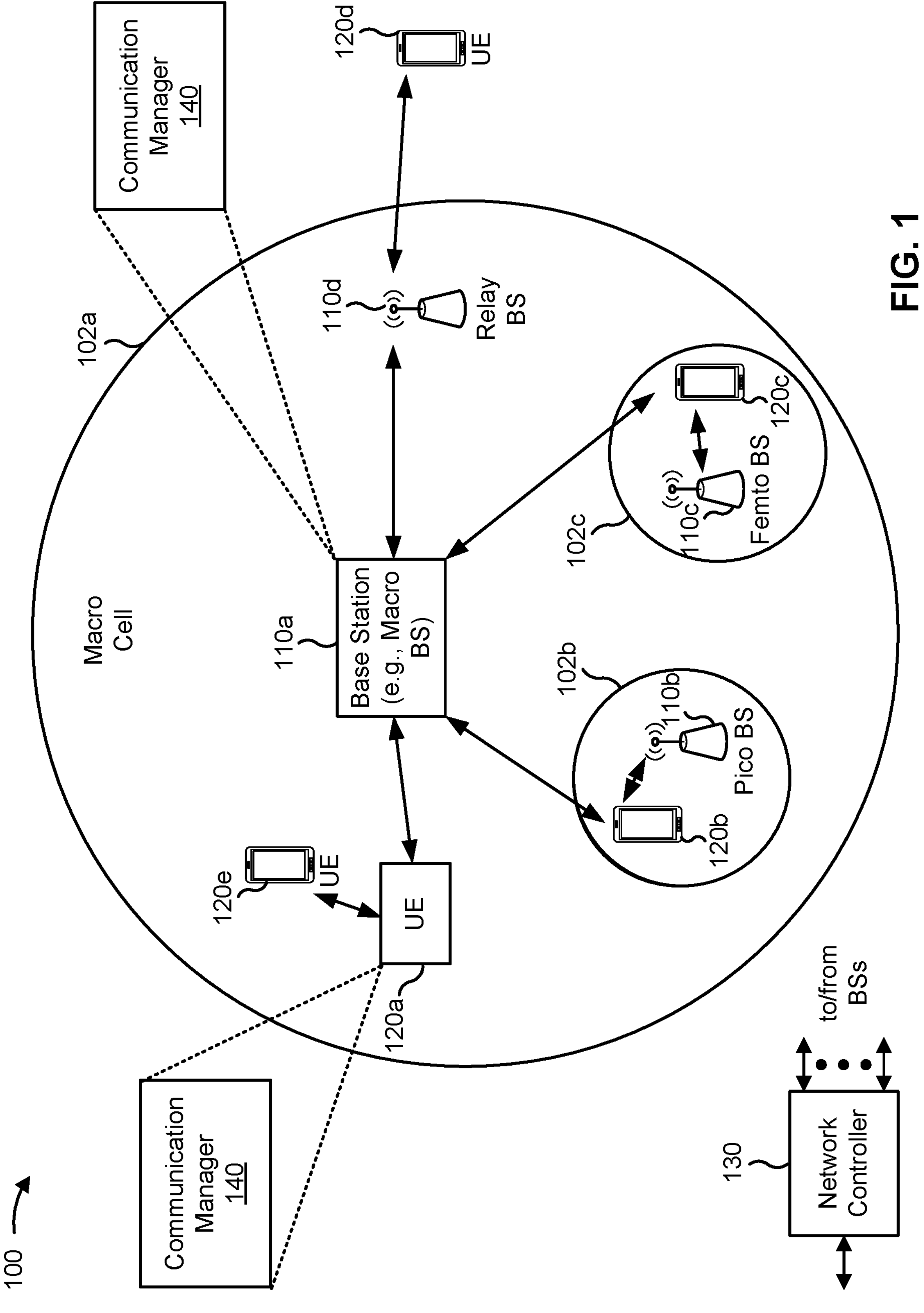
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, one or more network nodes of a disaggregated base station, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device, such as UE 120 or BS 110 or a network node of a disaggregated base station, may include a communication manager 140. As described in more detail elsewhere herein, the communication manager 140 may establish a first carrier of a carrier aggregation (CA) configuration, wherein the first carrier is associated with a first numerology; establish a second carrier of the CA configuration, wherein the second carrier is associated with a second numerology different than the first numerology; receive information indicating a first set of radio link control (RLC) parameters for the first numerology and a second set of RLC parameters for the second numerology; perform an RLC function for a first communication on the first carrier using the first set of RLC parameters; and perform the RLC function for a second communication on the second carrier using the second set of RLC parameters. Additionally, or alternatively, the communication manager 140 may perform one or more other operations described herein.

As indicated above, FIG. 1 is provided as an example. Other examples may differ from what is described with regard to FIG. 1.

Figure 2:
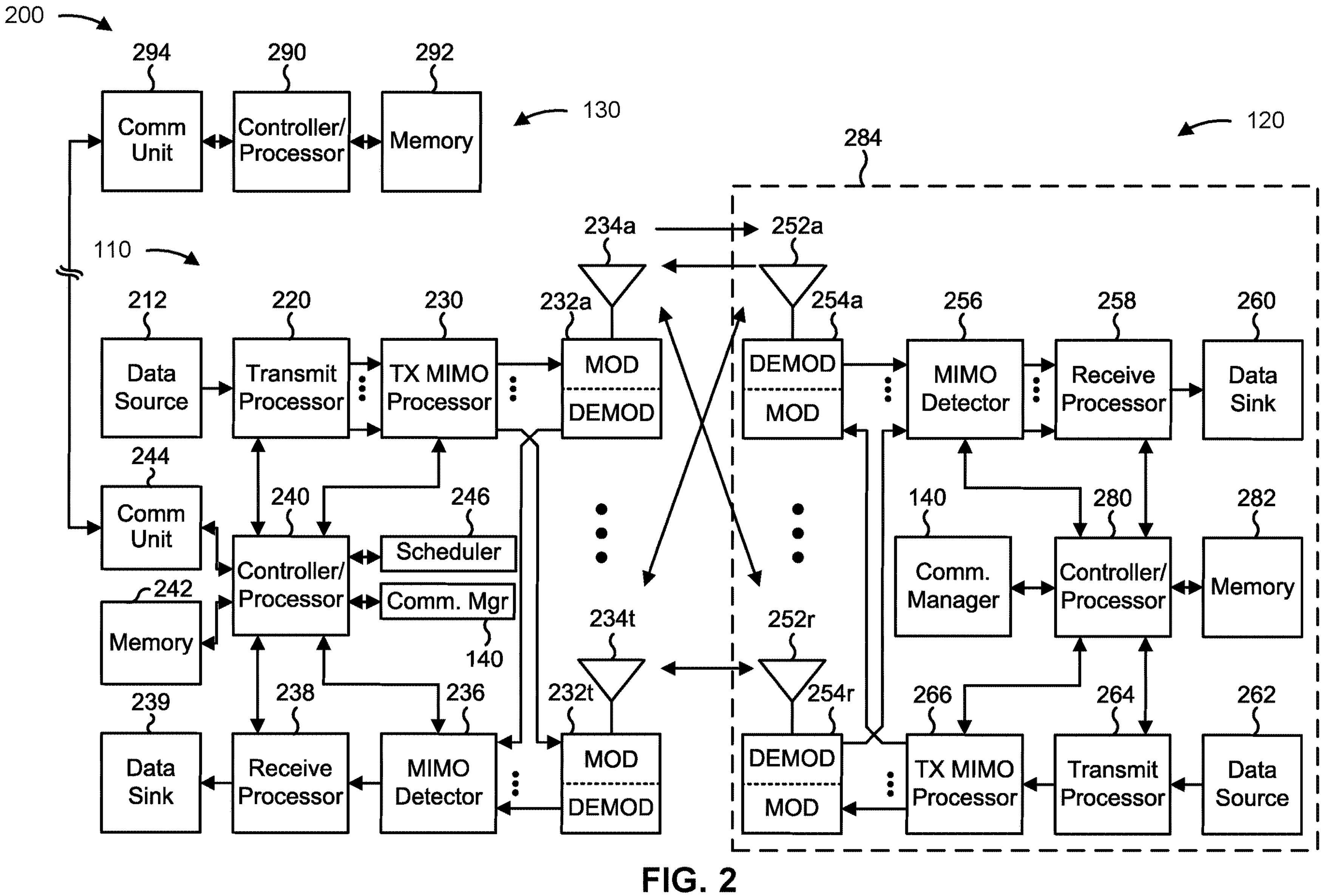
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with split RLC functionality for carrier aggregation, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, a wireless communication device (e.g., UE 120, BS 110, a network node of a disaggregated base station) includes means for establishing a first carrier of a CA configuration, wherein the first carrier is associated with a first numerology; means for establishing a second carrier of the CA configuration, wherein the second carrier is associated with a second numerology different than the first numerology; means for receiving information indicating a first set of RLC parameters for the first numerology and a second set of RLC parameters for the second numerology;

means for performing an RLC function for a first communication on the first carrier using the first set of RLC parameters; and/or means for performing the RLC function for a second communication on the second carrier using the second set of RLC parameters. In some aspects, the means for the wireless communication device to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a NB, eNB, NR BS, 5G NB, gNB, AP, TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof). An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. For example, a first set of protocol functions may be implemented at a CU, a second set of protocol functions may be implemented at a DU, and a third set of protocol functions may be implemented at an RU. A functional split may indicate which protocol functions are implemented at the CU, the DU, or the RU. In one example, packet data convergence protocol (PDCP) functions may be implemented at the CU, and RLC functions may be implemented at the DU, though other functional splits may be used (e.g., a functional split in which PDCP functions and RLC functions are both implemented at the CU, a functional split in which PDCP functions and RLC functions are both implemented at the CU, a functional split in which the CU and the DU are co-located). The various units of the disaggregated base station may be configured for wired or wireless communication with at least one other unit of the disaggregated base station.

Figure 3:
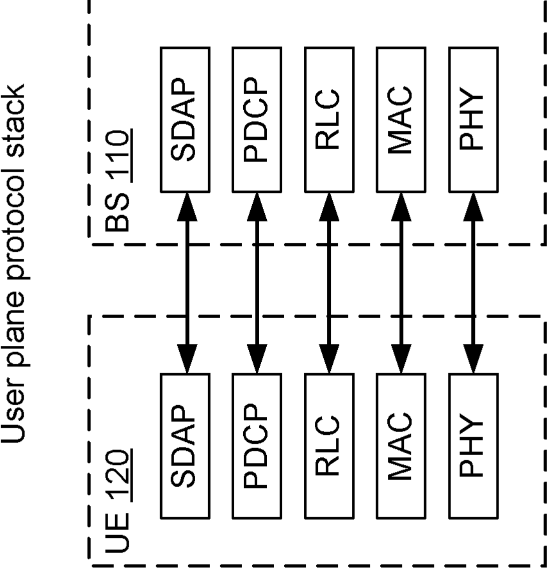
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the BS 110 may include respective physical (PHY) layers, medium access control (MAC) layers, RLC layers, PDCP layers, and service data adaptation protocol (SDAP) layers. A user plane function may handle transport of user data between the UE 120 and the BS 110. On the control plane, the UE 120 and the BS 110 may include respective radio resource control (RRC) layers. Furthermore, the UE 120 may include a non-access stratum (NAS) layer in communication with an NAS layer of an access and management mobility function (AMF). The AMF may be associated with a core network associated with the BS 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the BS 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into transport blocks (TBs), and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the BS 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload. According to the techniques described herein, a PDCP PDU can be passed to one of multiple RLC entities of the RLC layer, where each RLC entity is associated with a respective carrier or set of carriers. For example, a PDCP control PDU (that is a, PDCP PDU carrying control information) may be passed to or received from a selected RLC entity (e.g., a preferred RLC entity) of the multiple RLC entities. The selected RLC entity may be an RLC entity that performs RLC functions for PDCP control PDUs. In some aspects, traffic may be split between the multiple RLC entities. For example, a PDCP entity of the PDCP layer may pass traffic to (or receive traffic from) the multiple RLC entities in connection with a radio bearer, such as a signaling radio bearer or a data radio bearer. Thus, communications associated with different RLC entities can be associated with the same radio bearer.

The RLC layer can operate in an acknowledged mode (AM), an unacknowledged mode (UM), or a transparent mode (TM). In AM, buffering is performed at the transmitter and the receiver. Segmentation is performed at the transmitter and reassembly is performed at the receiver. A feedback mechanism (including an acknowledgment (ACK) or a negative ACK (NACK)) is used for communication (such as RLC PDUs or RLC SDUs). AM may be used for certain signaling radio bearers (such as SRB1, SRB2, and SRB3) and data radio bearers. A sequence number in AM, which may be used for reassembly and recovery, can be selected from a 12-bit size or an 18-bit size. In UM, buffering is performed at the transmitter and the receiver, segmentation is performed at the transmitter, reassembly is performed at the receiver, and no feedback mechanism is used. In TM, no RLC header is used, buffering is performed at the transmitter only, no segmentation or reassembly is performed, and no feedback mechanism is used.

An RLC transmitter in AM may perform segmentation and concatenation of a packet. The RLC transmitter may add an RLC header to the packet. The RLC transmitter may provide an RLC PDU with the RLC header to the MAC layer. The RLC transmitter may also buffer the RLC PDU in case of a NACK from the RLC receiver. If the RLC transmitter receives a NACK within a period of time, then the RLC transmitter may trigger retransmission of the buffered RLC PDU.

The RLC transmitter may use a transmit window to limit the number of RLC SDUs that are transmitted while waiting for an acknowledgment from an RLC receiver. The transmit window may start at the oldest transmitted RLC SDU which has not been fully acknowledged. The oldest transmitted RLC SDU may have been partly acknowledged if it was segmented prior to transmission. The transmit window advances as acknowledgments are received. The size of the transmit window is limited by the sequence number (SN) range. The transmit window is used to prevent SN ambiguity at the RLC receiver. The length of the SN is configured using an RRC parameter.

The RLC transmitter can request a status report from an RLC receiver, such as based at least in part on a number of PDUs transmitted since a previous request, or a data volume since a previous request. An RLC parameter pollPDU may indicate the number of PDUs transmitted since a previous request, and an RLC parameter pollByte may indicate the data volume since the previous request. If the RLC transmitter requests and does not receive a status report after waiting a period of time defined by an RLC parameter t-PollRetransmit, the RLC transmitter may retransmit the request. The status report may identify the SNs up to which all RLC SDUs have been successfully received, with the exception of RLC SDUs specified within the remainder of the status report. The status report may indicate to retransmit a complete RLC SDU, or may indicate to retransmit one or more segments of an RLC SDU.

An RLC receiver in AM may buffer a received RLC PDU (referred to as an AM data (AMD) PDU) if the RLC PDU is within a receive window, remove the RLC header, and perform reassembly. In AM, the RLC receiver may provide feedback regarding reception of RLC PDUs. In AM, each RLC PDU may be transmitted with an SN in ascending order. AM supports automatic repeat request (ARQ). The RLC receiver may transmit a status PDU (sometimes referred to as a status message or a status report) to indicate the status of RLC PDUs at the RLC receiver. The status PDU may indicate which RLC PDU SN(s) were not received by the RLC receiver. For example, the RLC receiver may use a reassembly timer (defined by an RLC parameter) t-reassembly. The RLC receiver may start the reassembly timer when a segment of an SDU is received and more segments are pending for that SDU (e.g., if one or more SNs of the SDU are missed). Once the SDU is completely received, the RLC receiver may stop the reassembly timer. If the reassembly timer expires without having received the one or more SNs that were missed, the RLC receiver may transmit a status report indicating one or more segments of the SDU that were not received. For example, the RLC receiver may wait for the length of the reassembly timer (in the hope that a hybrid ARQ (HARD) mechanism can provide for recovery via retransmission of the one or more SNs that were missed) before transmitting the status report to trigger RLC-layer retransmission of the one or more SNs that were missed.

As indicated above, FIG. 3 is provided as an example. Other examples may differ from what is described with regard to FIG. 3.

Figure 4:
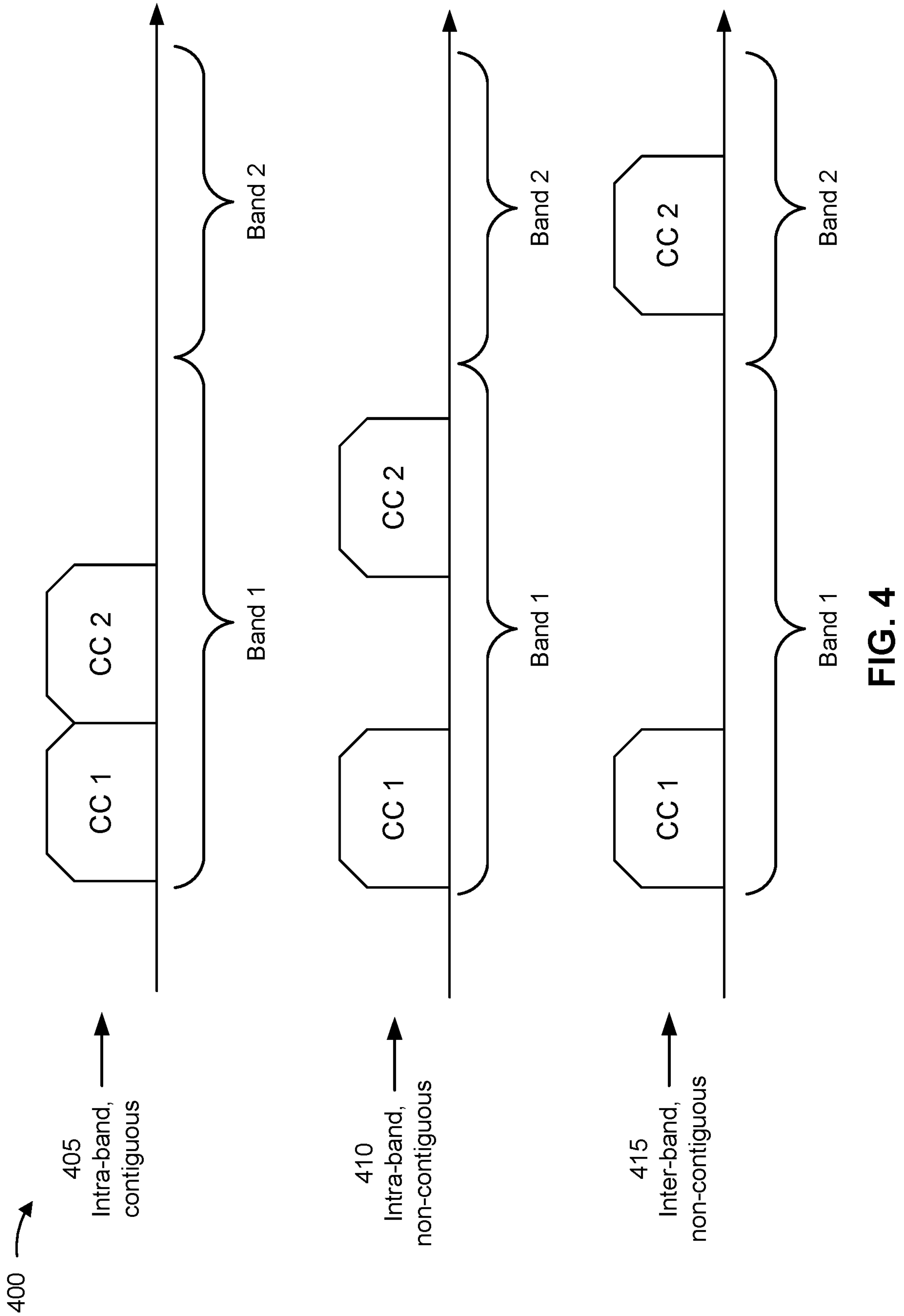
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in an RRC message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier itself, which may be referred to as self-carrier scheduling or carrier self-scheduling.

In some aspects, carrier aggregation may be used across multiple numerologies. A carrier may be configured with a numerology, which may be indicated by an index A numerology may indicate a subcarrier spacing (SCS) of the carrier in the frequency domain, as well as other parameters, such as a cyclic prefix length. The SCS may be used to derive the frequency domain bandwidth and the time domain duration of a resource element. In some aspects, a first carrier of a carrier aggregation configuration may have a first numerology (corresponding to a first SCS) and a second carrier of the carrier aggregation configuration may have a second numerology (corresponding to a second SCS). In some aspects, different numerologies may be used in different frequency ranges (which are defined elsewhere herein). For example, FR1 may typically be associated with numerologies $\mu$=0, 1, and 2 (which correspond to SCSs of 15 kHz, 30 kHz, and 60 kHz, respectively), while FR2 may typically be associated with numerologies $\mu$=2, 3, and 4 (which correspond to SCSs of 60 kHz, 120 kHz, and 240 kHz, respectively). Carrier aggregation can be used for carriers in different frequency ranges, such as a first group of carriers in FR1 (associated with numerologies in the range of $\mu$=0, 1, and 2) and a second group of carriers in FR2 (associated with numerologies in the range of $\mu$=2, 3, and 4).

As indicated above, FIG. 4 is provided as an example. Other examples may differ from what is described with regard to FIG. 4.

As mentioned above, a BS and a UE may perform various RLC functions for communications between the BS and the UE. The RLC functions are described in connection with FIG. 3. In some implementations, a BS and a UE may communicate using multiple carriers associated with different numerologies. As one example, a BS and a UE may communicate in carrier aggregation using a first group of carriers in a first frequency range and a second group of carriers in a second frequency range, where the first group of carriers use a first numerology and the second group of carriers use a second numerology different than the first numerology.

RLC functions may be performed according to a set of RLC parameters, which are described in more detail elsewhere herein. The set of RLC parameters may identify timers and thresholds for various RLC functions, such as recovery (sometimes referred to as reassembly) at an RLC receiver from one or more missed SNs. A set of RLC parameters that is suitable for a first numerology may not be suitable for a second numerology. For example, a reassembly timer for a 15 kHz SCS may be suitable at a longer length (due to the longer slot length of the 15 kHz SCS), whereas a reassembly timer for a 120 kHz SCS may be suitable at a shorter length (due to the shorter slot length of the 120 kHz SCS). In this example, the RLC receiver may conservatively use a set of parameters for the smaller SCS (e.g., 15 kHz) so that the smaller SCS's communications can be properly handled. However, using the set of parameters for the smaller SCS may lead to significant resource usage in association with buffering and processing traffic with the larger SCS (e.g., 120 kHz) due to the increased bandwidth at the larger SCS. Furthermore, a single RLC entity (that is, a single entity implementing the RLC functions of FIG. 3) may be mandated to perform a single RLC function of a certain type at a time (e.g., the single RLC entity may be permitted to run only one reassembly timer at a time), no matter how many sets of RLC parameters are configured. Similar issues can arise for carriers associated with different configurations, such as different numerologies, different duplexing configurations (e.g., time division duplexing versus frequency division duplexing), different scheduling delays, different frequency ranges (e.g., FR1 versus FR2), or different uplink/downlink slot allocations of time division duplexing carriers. This may lead to significant resource usage, delay in RLC functions, decreased throughput, and decreased reliability of communications.

Some techniques and apparatuses described herein provide communication in multiple numerologies using multiple RLC entities. For example, an RLC transmitter and/or an RLC receiver may use two or more RLC entities. In some aspects, an RLC entity may correspond to a numerology. For example, each RLC entity may be associated with a respective numerology, and each RLC entity may have its own set of RLC parameters, which may be suitable to the respective numerology. Thus, if there are two numerologies, an RLC transmitter may have a first RLC entity associated with a first numerology and a second RLC entity associated with a second numerology. If there are three numerologies, an RLC transmitter may have three RLC entities: one for each of the three numerologies. Furthermore, these techniques can be applied for a combination of a numerology and a duplexing configuration (that is, whether a carrier is configured as a time division duplexing (TDD) carrier or a frequency division duplexing (FDD) carrier). As used herein, "configuration" can refer to a combination of a numerology and a duplexing configuration, or to a numerology alone. For example, a UE associated with a first configuration of [TDD, 15 kHz] and a second configuration of [FDD, 15 kHz] may use two RLC entities: one for each configuration. Still further, these techniques can be applied for any number of configurations. Furthermore, a "configuration," in the context of RLC entities, can include a combination of any one or more of a duplexing configuration, a scheduling delay, a numerology, a frequency range, or an uplink/downlink slot allocation (e.g., a TDD downlink/uplink slot configuration as may be provided via a common RRC configuration, a dedicated RRC configuration, or a slot format indication). In some aspects, the multiple RLC entities may perform RLC functions in parallel, such that an RLC function can be performed by a first RLC entity at the same time as an RLC function (e.g., the same RLC function or a different RLC function) by a second RLC entity. Thus, resource consumption is reduced, delay in RLC functions is reduced, throughput is increased, and reliability of communications is improved. These improvements may be particularly relevant for carrier aggregation using carriers of different numerologies.

Figure 5:
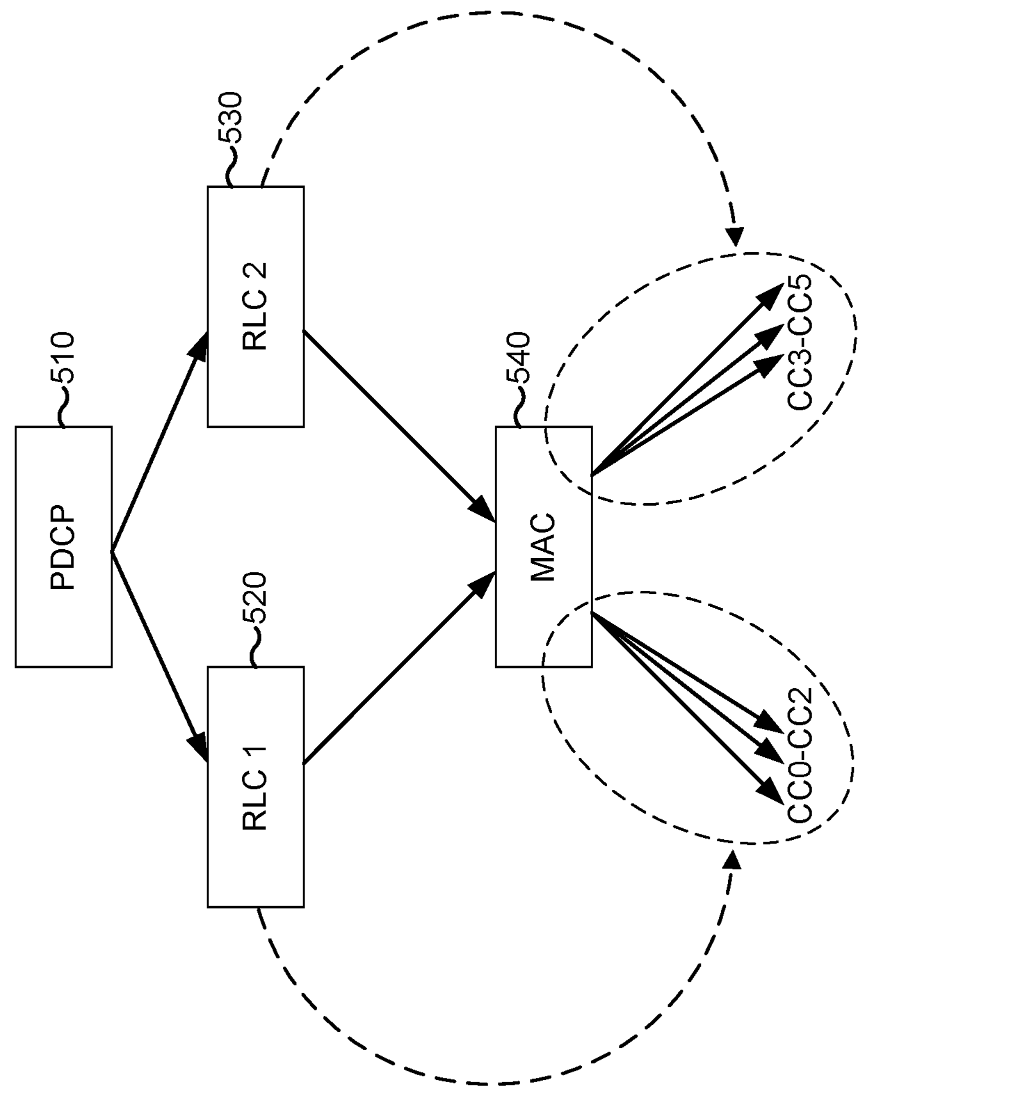
FIG. 5 is a diagram illustrating an example of a protocol architecture for carrier aggregation using two radio link control (RLC) entities, in accordance with the present disclosure.

FIG. 5 is a diagram illustrating an example 500 of a protocol architecture for carrier aggregation using two RLC entities, in accordance with the present disclosure. The protocol architecture can be used at an RLC transmitter or at an RLC receiver. For example, the protocol architecture can be used at a UE 120, a base station 110, or another receiver or transmitter in a network such as wireless network 100.

As shown by reference number 510, the protocol architecture includes a PDCP entity. The PDCP entity may perform functions of the PDCP layer, such as those described in connection with FIG. 3. In some aspects, as illustrated, the protocol architecture may include a single PDCP entity. For example, the single PDCP entity may perform the functions of the PDCP layer.

As shown by reference number 520, the protocol architecture includes a first RLC entity. As shown by reference number 530, the protocol architecture includes a second RLC entity. The first RLC entity is associated with a first group of carriers (shown as component carriers (CCs) 0 through 2), and the second RLC entity is associated with a second group of carriers (shown as CCs 3 through 5). In some aspects, the first group of carriers and the second group of carriers are associated with a radio bearer (e.g., the same radio bearer) such as a data radio bearer or a signaling radio bearer of the PDCP entity. In some aspects, the first group of carriers may be associated with a first configuration and the second group of carriers may be associated with a second configuration. The first configuration may indicate a first numerology of the first group of carriers. In some aspects, the first configuration may also indicate whether the first group of carriers are TDD carriers or FDD carriers. The second configuration may indicate a second numerology of the second group of carriers. In some aspects, the second configuration may also indicate whether the second group of carriers are TDD carriers or FDD carriers. In some aspects, the first configuration or the second configuration may indicate at least one of a duplexing configuration (e.g., TDD versus FDD), a scheduling delay, a numerology, a frequency range, or an uplink/downlink slot allocation (e.g., a TDD downlink/uplink slot configuration as may be provided via a common RRC configuration, a dedicated RRC configuration, or a slot format indication). Communications associated with the first configuration may be handled by the first RLC entity and communications associated with the second configuration may be handled by the second RLC entity. For example, RLC functions (such as any function performed by an RLC layer, such as those described in connection with FIG. 3) for the first group of carriers may be handled by the first RLC entity and RLC functions for the second group of carriers may be handled by the second RLC entity. In some aspects, the first group of carriers may be in a first frequency range (e.g., FR1, a sub-6 frequency range) and the second group of carriers may be in a second frequency range (e.g., FR2, a mmW frequency range). As shown by reference number 540, the protocol architecture may include a single MAC entity, which may perform functions of the MAC layer, such as those described in connection with FIG. 3.

The first RLC entity may be associated with a first set of RLC parameters. The second RLC entity may be associated with a second set of RLC parameters. A set of RLC parameters may include, at an RLC receiver, a t-reassembly value, a t-statusProhibit value (which indicates a length of time within which only a single status report can be transmitted), or the like. A set of RLC parameters may include, at an RLC transmitter, a pollPDU value, a pollByte value, a t-PollRetransmit value (which may indicate a length of time within which only a single poll request can be transmitted), a maxRetxThreshold value (which may indicate a number of times a poll request can be retransmitted), or the like.

In some aspects, the first set of RLC parameters may be different from the second set of RLC parameters. For example, if the first group of carriers is associated with a first configuration that is different than a second configuration of the second group of carriers, the first set of RLC parameters may be different from the second set of RLC parameters. In some aspects, a set of RLC parameters may be based at least in part on a configuration. For example, one or more timers indicated by a set of RLC parameters may be shorter for a configuration involving a shorter symbol length (e.g., with a larger SCS) than for a configuration involving a longer symbol length (e.g., with a smaller SCS). As used herein, a first SCS is considered larger than a second SCS if the first SCS has a larger bandwidth (e.g., a 60 kHz SCS is larger than a 30 kHz SCS).

The first RLC entity and the second RLC entity may perform RLC functions separately from each other. For example, the first RLC entity may perform an RLC function for the first group of carriers and the second RLC entity may perform the RLC function for the second group of carriers. As an example, consider recovery from a missed SN of an SDU. If the SDU is missed on a carrier of the first group of carriers, the first RLC entity may perform recovery of the SDU using the first set of RLC parameters. If the SDU is missed on a carrier of the second group of carriers, the second RLC entity may perform recovery of the SDU using the second set of RLC parameters.

Using the different sets of parameters (which may be associated with different configurations) may improve the performance of RLC functions for carriers of different configurations. For example, if a single RLC entity is configured with a single set of parameters to be used for two different configurations, then the single set of parameters may be sub-optimal for one or both of the two different configurations. For example, a reassembly timer for a configuration with a 15 kHz SCS may be too long for a configuration with a 120 kHz SCS, since the RLC receiver may be required to buffer relatively more traffic of the 120 kHz SCS than of the 15 kHz SCS due to higher throughput at the 120 kHz SCS. By providing different sets of RLC parameters for different configurations, RLC function performance is improved, UE resource usage is reduced, and throughput is increased.

Furthermore, using two different RLC entities for different configurations allows the UE to perform RLC functions in parallel for the different configurations. For example, a UE using a single RLC entity may be mandated to perform a single reassembly or recovery function (such as using a reassembly timer) at a time. If missed SNs are detected on two different configurations, the UE may have to perform a first recovery RLC function for a first configuration, and a second recovery RLC function for a second configuration sequentially after the first recovery RLC function, which further increases UE resource usage, delay associated with RLC functions, and the occurrence of missed communications. By performing RLC functions in parallel using the first RLC entity and the second RLC entity, UE resource usage is reduced (since information associated with the second RLC function does not need to be buffered throughout the first RLC function), delay associated with RLC functions is reduced, and the occurrence of missed communications is reduced.

As indicated above, FIG. 5 is provided as an example. Other examples may differ from what is described with regard to FIG. 5. For example, while FIG. 5 includes an example associated with two configurations, the techniques described herein can be performed for any number of configurations greater than or equal to two.

Figure 6:
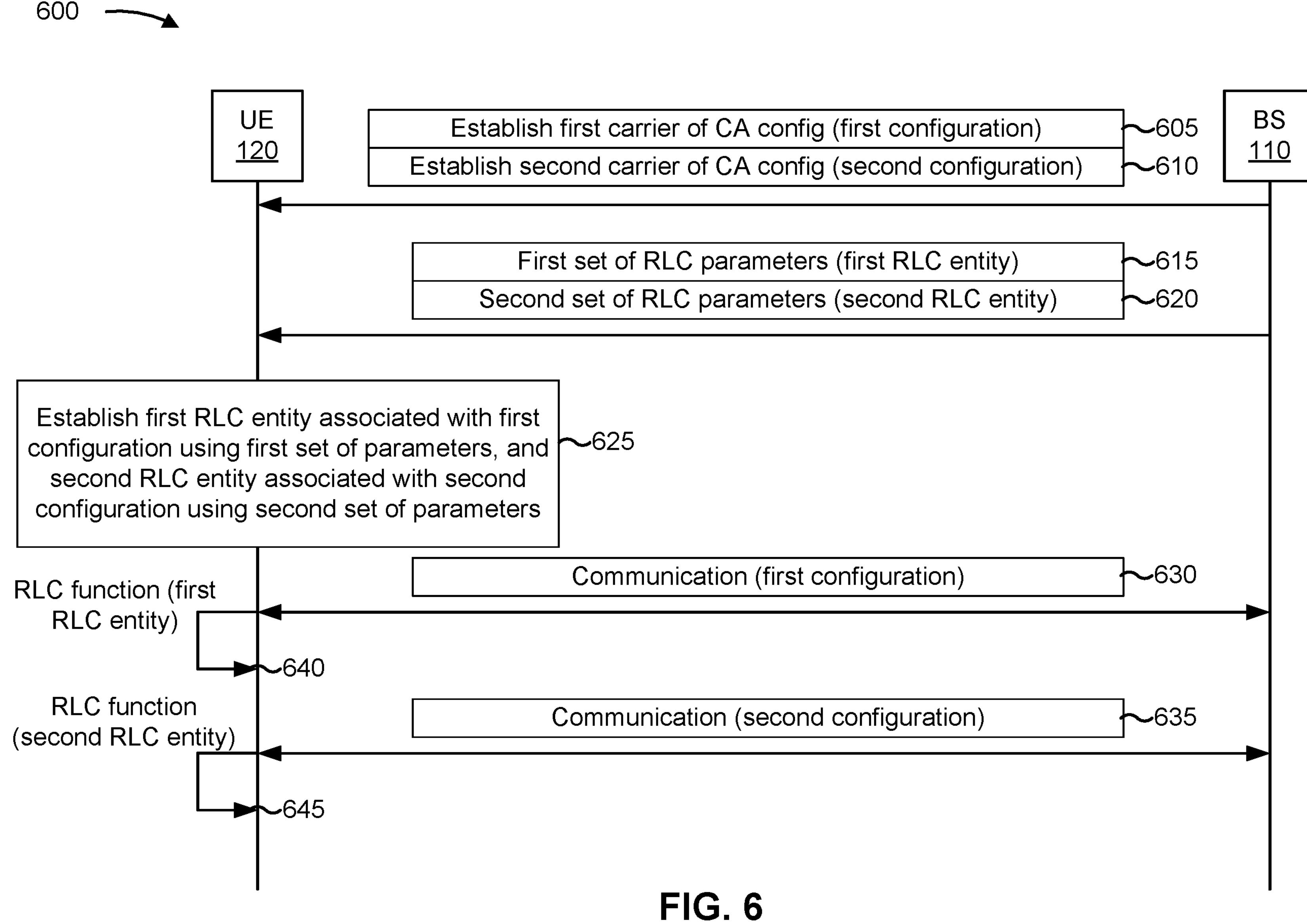
FIG. 6 is a diagram illustrating an example of signaling associated with using multiple RLC entities for multiple numerologies, in accordance with the present disclosure.

FIG. 6 is a diagram illustrating an example 600 of signaling associated with using multiple RLC entities for multiple configurations, in accordance with the present disclosure. Example 600 includes a UE 120 and a BS 110.

As shown in FIG. 6, and by reference numbers 605 and 610, the BS 110 and the UE 120 may establish a first carrier and a second carrier of a carrier aggregation configuration. The first carrier may be associated with (e.g., configured with) a first configuration and the second carrier may be associated with (e.g., configured with) a second configuration that is different than the first configuration. The first configuration may be associated with (e.g., indicate) a first numerology and/or a first duplexing configuration. The second configuration may be associated with (e.g., indicate) a second numerology and/or a second duplexing configuration. In some aspects, the UE 120 and the BS 110 may establish a first group of carriers including the first carrier and/or a second group of carriers including the second carrier. In some aspects, the first carrier may be associated with (e.g., in) a first frequency range and the second carrier may be associated with (e.g., in) a second frequency range different than the first frequency range. In some other aspects, the first carrier and the second carrier may be in the same frequency range (e.g., with different configurations within the same frequency range). In some aspects, the BS 110 and the UE 120 may establish carriers associated with more than two configurations. In this case, the techniques described herein can be applied for the carriers associated with more than two configurations (e.g., using one RLC entity per configuration).

As shown by reference number 615 and 620, the UE 120 may receive information indicating a first set of RLC parameters and a second set of RLC parameters. This information can be provided via a single transmission or two separate transmissions. In some aspects, the UE 120 may receive this information in connection with establishing the first carrier and/or the second carrier (e.g., the UE 120 may receive information indicating a set of RLC parameters via signaling associated with establishing a carrier). In some other aspects, the UE 120 may receive this information separately from carrier establishment. A set of RLC parameters (e.g., the first set of RLC parameters, the second set of RLC parameters) may include one or more RLC parameters described in connection with FIGS. 3 and/or 5, above.

The first set of RLC parameters may be associated with the first configuration and the second set of RLC parameters may be associated with the second configuration. Additionally, or alternatively, the first set of RLC parameters may be for a first RLC entity (which may handle communications associated with the first configuration) and the second set of RLC parameters may be for a second RLC entity (which may handle communications associated with the second configuration). Additionally, or alternatively, the first set of RLC parameters may be for the first carrier and the second set of RLC parameters may be for the second carrier.

As shown by reference number 625, the UE 120 may establish a first RLC entity and a second RLC entity. The first RLC entity may be associated with the first configuration and may use the first set of RLC parameters. The second RLC entity may be associated with the second configuration and may use the second set of RLC parameters. Additionally, or alternatively, the first RLC entity may be associated with the first carrier and the second RLC entity may be associated with the second carrier. Additionally, or alternatively, the first RLC entity may be associated with the first frequency range (e.g., may handle RLC functions for all carriers in the first frequency range) and the second RLC entity may be associated with the second frequency range (e.g., may handle RLC functions for all carriers in the second frequency range). In some aspects, the UE 120 may establish a first RLC transmitter entity (e.g., an RLC entity used for transmission by the UE 120), a first RLC receiver entity (e.g., an RLC entity used for reception by the UE 120), a second RLC transmitter entity (e.g., an RLC entity used for transmission by the UE 120), and a second RLC receiver entity (e.g., an RLC entity used for reception by the UE 120). In some other aspects, the UE 120 may establish a single first RLC entity and a single second RLC entity.

As shown by reference number 630, the UE 120 may perform a communication using the first configuration, such as on the first carrier. Furthermore, as shown by reference number 635, the UE 120 may perform a communication using the second configuration, such as on the second carrier. As shown by reference number 640, the UE 120 (e.g., the first RLC entity) may perform an RLC function for the first communication. As shown by reference number 645, the UE 120 (e.g., the second RLC entity) may perform the RLC function (e.g., the same RLC function or a different RLC function) for the second communication. For example, the first RLC entity may use the first set of RLC parameters. The second RLC entity may use the second set of RLC parameters. In some aspects, the UE 120 may perform the RLC function for the first communication and for the second communication in parallel. Additionally, or alternatively, the UE 120 may perform the RLC function for the first communication in sequence with the RLC function for the second communication (e.g., using the first set of parameters and the second set of parameters, respectively). As used herein, "communication" can refer to an RLC PDU, an RLC SDU, a transmission carrying one or more RLC PDUs and/or RLC SDUs, or the like.

In some aspects, the RLC function may be a reassembly function, such as may be associated with a reassembly timer. For example, the UE 120 may detect a missed SN of a communication. Depending on whether the communication is on the first carrier or the second carrier, the UE 120 may activate a reassembly timer identified by the first set of RLC parameters or the second set of RLC parameters. For example, the UE 120 may activate a reassembly timer identified by the first set of RLC parameters if the communication is on the first carrier and may activate a reassembly timer identified by the second set of RLC parameters if the communication is on the second carrier. If the missed SN is not received by the end of the reassembly timer, the UE 120 may transmit a status report indicating the missed SN. For example, the status report may be transmitted according to the same set of RLC parameters used to determine the reassembly timer. Thus, the UE 120 may reduce buffer size, reduce latency associated with missed SN recovery, and improve throughput.

In some aspects, a communication (such as the communications shown by reference numbers 630 and 635) may carry an RLC PDU, such as an AMD PDU. In some aspects, the RLC PDU may include a field indicating whether the RLC PDU is associated with the first configuration or the second configuration. For example, the field may be a numerology information field that includes a value indicating a configuration associated with the RLC PDU. An RLC transmitter that generates the RLC PDU may set the field to the value associated with the configuration to be used for the RLC PDU. An RLC receiver may identify whether the RLC PDU should be handled by the first RLC entity or the second RLC entity based at least in part on the field. For example, the RLC receiver may identify whether RLC functions for the RLC PDU should be performed by the first RLC entity or the second RLC entity. In some aspects, the RLC PDU may be a status report, such as based at least in part on an RLC entity's reassembly timer (associated with the configuration indicated by the field) expiring or based at least in part on the RLC entity receiving a poll message associated with the configuration. A poll message or a status report associated with a particular configuration (e.g., relating to a communication using the particular configuration) may be said to be specific to the particular configuration.

In some aspects, communications associated with the first configuration and communications associated with the second configuration may be differentiated based at least in part on an SN. For example, the set of potential SNs assignable to communications may be divided into subsets corresponding to various configurations. If there are M configurations configured for a set of carriers, the set of potential SNs may be divided into M subsets, and each configuration may be associated with a subset (e.g., the mth configuration may be associated with the mth subset). In some aspects, the M subsets may have interleaved SNs. As one example, all communications associated with a first configuration may have odd SNs and all communications associated with a second configuration may have even SNs. An RLC entity associated with a particular configuration may perform RLC functions such as reassembly according to SNs belonging to a subset associated with the particular configuration. By using subsets of a set of SNs, signaling overhead associated with conveying a field indicating a configuration, and impact on RLC PDU format, are reduced.

In some aspects, the UE 120 may transmit a status report (e.g., the communication shown by reference number 630 or 635 may be a status report). In this case, the status report may indicate whether the status report is associated with the first configuration or the second configuration, as described above. In some aspects, the UE 120 may transmit the status report based at least in part on expiration of a reassembly timer associated with a particular configuration. For example, consider a UE 120 performing two reassembly functions: one for a carrier with a first configuration in FR1, and another for a carrier with a second configuration in FR2. In this case, a reassembly timer associated with the carrier in FR2 may expire prior to a reassembly timer associated with the carrier in FR1. Therefore, the UE 120 may transmit a status report indicating a NACK for the carrier in FR2. However, the reassembly function for the carrier in FR1 may still be ongoing due to the longer reassembly timer associated with the carrier in FR1. For example, there may still be time, according to the longer reassembly timer, for the UE 120 to recover a missing SN on the carrier in FR1. In some cases, the UE 120 may receive a poll message requesting a status report for a carrier for which a reassembly timer is ongoing.

In some aspects, the status report transmitted by the UE 120 may indicate an unavailable status for an SN. Continuing the above example, the status report may indicate a NACK for the carrier in FR2, and may indicate that a status of a missed SN of the carrier in FR1 is unavailable. The unavailable status may indicate that a reassembly timer for the carrier in FR1 has not yet elapsed (e.g., that the reassembly timer is ongoing). Therefore, the unavailable status may not trigger RLC retransmission of the communication associated with the missed SN. For example, the BS 110 may not perform RLC retransmission of the communication associated with the missed SN if the status report indicates an unavailable status. In some aspects, the status report may indicate an unavailable status pertaining to a single carrier (e.g., the report may not also indicate an ACK/NACK for a different carrier). For example, the status report may indicate an unavailable status for only one carrier.

By providing a NACK for a first carrier associated with an elapsed reassembly timer and an unavailable status for a second carrier associated with an ongoing reassembly timer (e.g., across both RLC entities), the UE 120 may be able to begin RLC recovery for the first carrier while the reassembly timer runs for the second carrier. Once the reassembly timer elapses for the second carrier, the UE 120 may transmit a NACK for the second carrier (if the missed SN has not been received). This may be particularly useful when an RLC transmitter transmits a poll message requesting the status message, since the RLC transmitter can reduce a size of a buffer according to the NACK for the first carrier while continuing to buffer according to the unavailable status for the second carrier. Furthermore, UE RLC transmitter resources may be conserved, as the UE needs not perform duplication (e.g., PDCP duplication) for acknowledged SNs, thereby reducing buffer size, transmit power, and network resource consumption.

Figure 7:
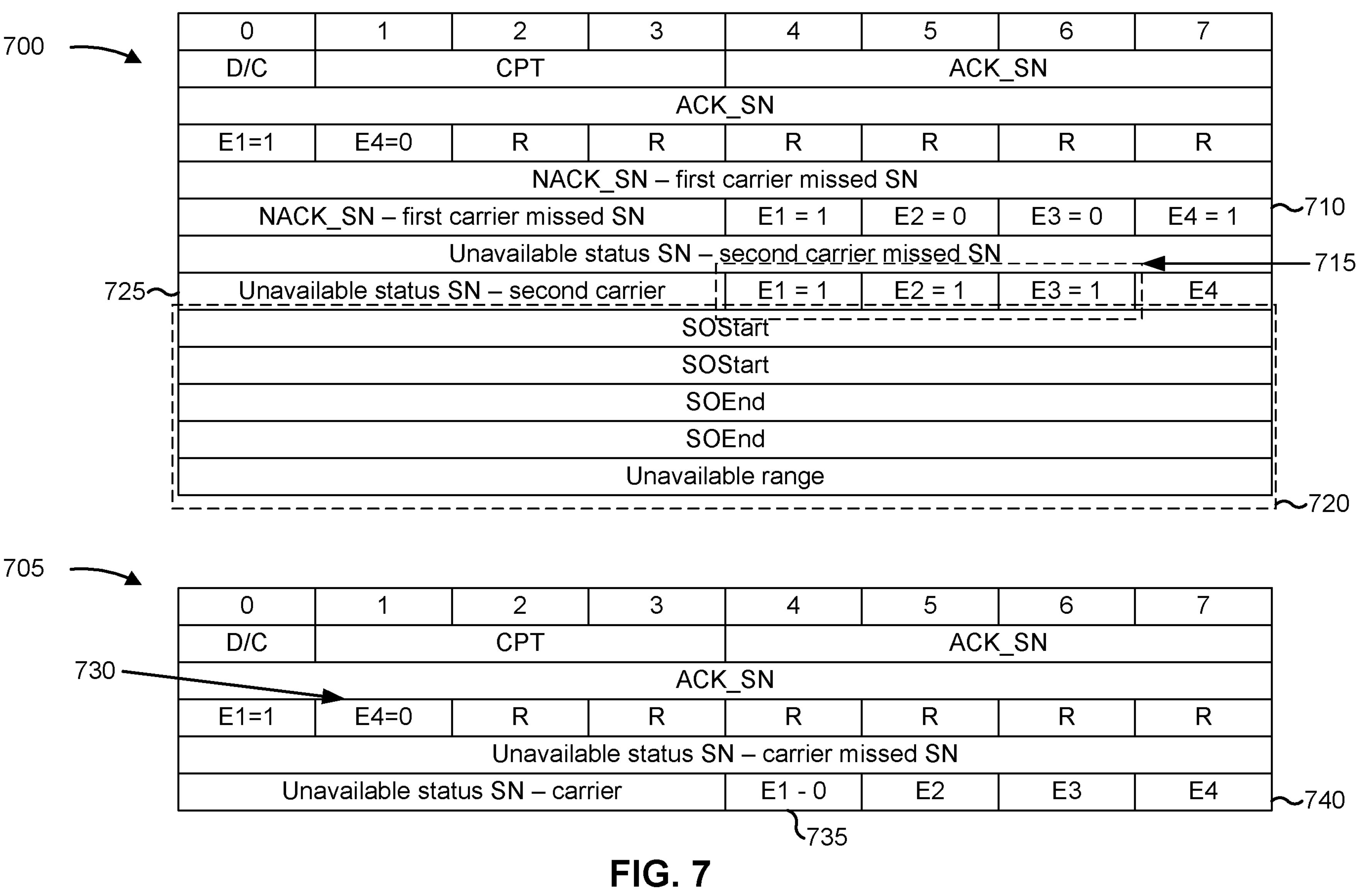
FIG. 7 is a diagram illustrating examples of RLC protocol data unit structures including an unavailable status, in accordance with the present disclosure.

FIG. 7 is a diagram illustrating examples 700 and 705 of RLC PDU structures including an unavailable status, in accordance with the present disclosure. In some aspects, an RLC PDU carrying a status report (e.g., a status PDU) may include a field that indicates whether the RLC PDU indicates a NACK or an unavailable status. For example, an RLC PDU may have an E1 field, an E2 field, and an E3 field. The E1 field may indicate whether a NACK field is included in the RLC PDU. A NACK field indicates a first SN that was missed. The E2 field may indicate whether a segment offset (SO) field (indicating a position of an RLC SDU segment, associated with the first SN, within an RLC SDU) is included in the RLC PDU. The E3 field may indicate whether a NACK range field follows the NACK field. A NACK range indicates a number of consecutive RLC SDUs that were missed, starting from an SN specified by the NACK field. In some aspects, the RLC PDU may include an E4 field. The E4 field may indicate whether the status report indicates a NACK or an unavailable status. For example, if the E1 field indicates a NACK field is included, then a first value of E4 may indicate that the E1, E2, and E3 fields are associated with a NACK, and a second value of E4 may indicate that the E1, E2, and E3 fields are associated with an unavailable status. The E1, E2, and E3 fields may indicate whether a field indicating a first SN that is unavailable is present, whether an SO field is present, and whether an unavailable range field follows the field indicating the first SN (e.g., respectively). In some aspects, the status report may indicate an acknowledgment for all SNs, associated with the carrier for which the status report was triggered (e.g., based at least in part on a reassembly timer or a poll PDU), except SNs that are unavailable or negatively acknowledged, up to a highest acknowledged SN (represented by ACK SN). The UE may report an unavailable status for an RLC hole if the reassembly timer is still running for the RLC hole or if the reassembly timer has not yet been started for that RLC hole. An RLC hole is a set of missing RLC SNs associated with one or more RLC PDUs.

Example 700 shows a status PDU with an 18-bit SN and an SO field. In example 700, the E4 value of 1 (shown by reference number 710) indicates that an E1, E2, and E3 value associated with the second carrier (shown by reference number 715) is associated with (e.g., used for) indication of an unavailable status for an SN. Thus, the fields shown by reference number 720 may indicate an SO and a range of unavailable SNs, while the field shown by reference number 725 may indicate a first unavailable SN.

Example 705 shows a status PDU with a 12-bit SN and no SO field carrying an unavailable status. In example 700, the E4 value shown by reference number 730 is set to 0, indicating that the ACK does not indicate an unavailable status. Furthermore, the E1 value shown by reference number 735 is set to 0 (indicating no NACK/unavailable fields, SO fields, or NACK/unavailable ranges), so the E4 value shown by reference number 740 is reserved.

As indicated above, FIGS. 6 and 7 are provided as examples. Other examples may differ from what is described in connection with FIGS. 6 and 7.

Figure 8:
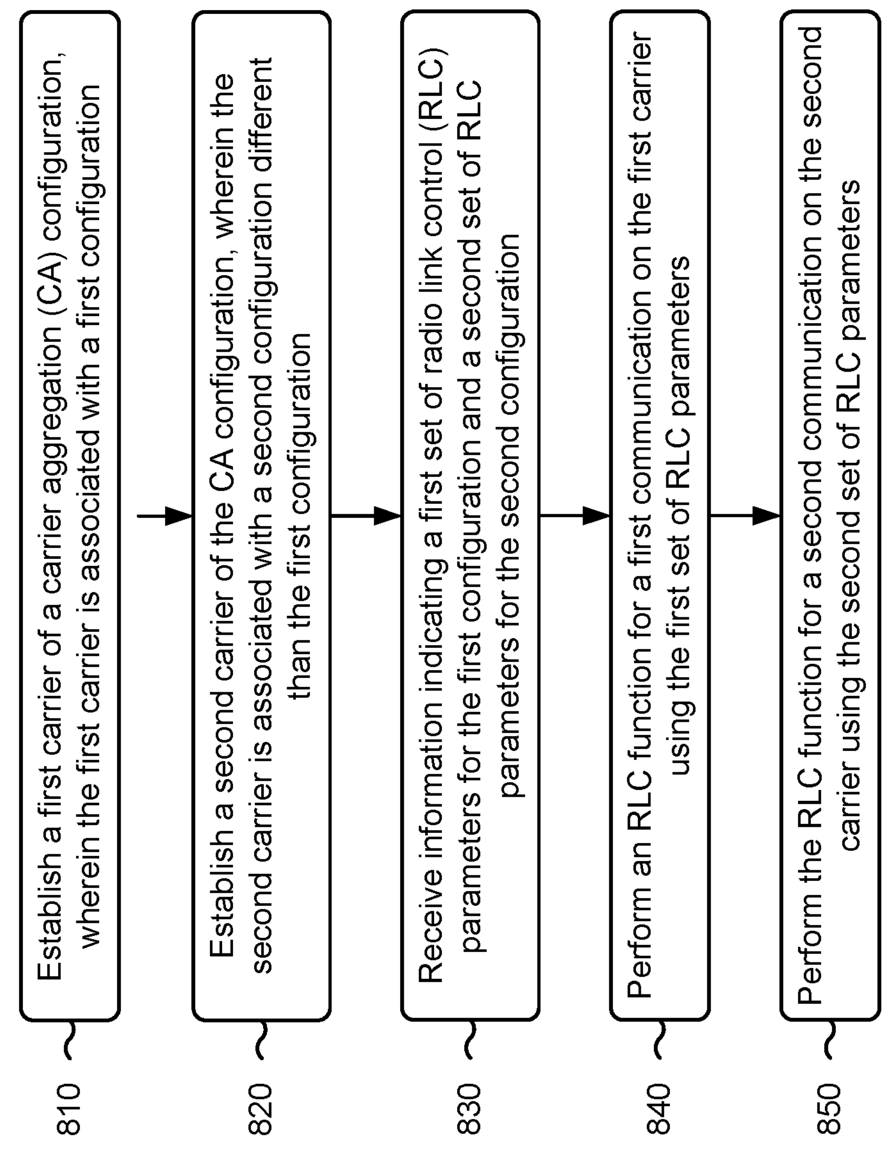
FIG. 8 is a diagram illustrating an example process performed, for example, by a wireless communication device, in accordance with the present disclosure.

FIG. 8 is a diagram illustrating an example process 800 performed, for example, by a wireless communication device, in accordance with the present disclosure. Example process 800 is an example where the wireless communication device (e.g., UE 120, BS 110, a network node of a disaggregated base station) performs operations associated with radio link control for mixed configuration. In some aspects, the wireless communication device is an RLC transmitter (e.g., a device or network node performing RLC functions for transmission of a communication). In some aspects, the wireless communication device is an RLC receiver (e.g., a device or network node performing RLC functions for reception of a communication).

As shown in FIG. 8, in some aspects, process 800 may include establishing a first carrier of a CA configuration, wherein the first carrier is associated with a first configuration (block 810). For example, the wireless communication device (e.g., using communication manager 140 and/or transmission component 904, depicted in FIG. 9) may establish a first carrier of a CA configuration, wherein the first carrier is associated with a first configuration, as described above. In some aspects, the first configuration may indicate a numerology of the first carrier. In some aspects, the first configuration may indicate a numerology of the first carrier and whether the first carrier is a TDD carrier or an FDD carrier.

As further shown in FIG. 8, in some aspects, process 800 may include establishing a second carrier of the CA configuration, wherein the second carrier is associated with a second configuration different than the first configuration (block 820). For example, the wireless communication device (e.g., using communication manager 140 and/or transmission component 904, depicted in FIG. 9) may establish a second carrier of the CA configuration, wherein the second carrier is associated with a second configuration different than the first configuration, as described above. In some aspects, the second configuration may indicate a numerology of the second carrier. In some aspects, the second configuration may indicate a numerology of the second carrier and whether the second carrier is a TDD carrier or an FDD carrier.

As further shown in FIG. 8, in some aspects, process 800 may include receiving information indicating a first set of RLC parameters for the first configuration and a second set of RLC parameters for the second configuration (block 830). For example, the wireless communication device (e.g., using communication manager 140 and/or reception component 902, depicted in FIG. 9) may receive information indicating a first set of RLC parameters for the first configuration and a second set of RLC parameters for the second configuration, as described above.

As further shown in FIG. 8, in some aspects, process 800 may include performing an RLC function for a first communication on the first carrier using the first set of RLC parameters (block 840). For example, the wireless communication device (e.g., using communication manager 140 and/or first RLC component 908, depicted in FIG. 9) may perform an RLC function for a first communication on the first carrier using the first set of RLC parameters, as described above.

As further shown in FIG. 8, in some aspects, process 800 may include performing the RLC function for a second communication on the second carrier using the second set of RLC parameters (block 850). For example, the wireless communication device (e.g., using communication manager 140 and/or second RLC component 910, depicted in FIG. 9) may perform the RLC function for a second communication on the second carrier using the second set of RLC parameters, as described above.

Process 800 may include additional aspects, such as any single aspect or any combination of aspects described below and/or in connection with one or more other processes described elsewhere herein.

In a first aspect, establishing the first carrier comprises establishing a first RLC entity associated with the first configuration, and wherein establishing the second carrier comprises establishing a second RLC entity associated with the second configuration.

In a second aspect, alone or in combination with the first aspect, the RLC function is performed for the first communication by the first RLC entity and for the second communication by the second RLC entity.

In a third aspect, alone or in combination with one or more of the first and second aspects, process 800 includes communicating a PDCP control PDU on a selected RLC entity of the first RLC entity and the second RLC entity.

In a fourth aspect, alone or in combination with one or more of the first through third aspects, the RLC function is performed in parallel for the first carrier and for the second carrier.

In a fifth aspect, alone or in combination with one or more of the first through fourth aspects, the first communication or the second communication is via at least one of a data radio bearer or a signaling radio bearer.

In a sixth aspect, alone or in combination with one or more of the first through fifth aspects, the RLC function is associated with one of an acknowledged mode or an unacknowledged mode.

In a seventh aspect, alone or in combination with one or more of the first through sixth aspects, the RLC function is based at least in part on an RLC PDU, and wherein the RLC PDU includes a field indicating whether the RLC PDU is associated with the first configuration or the second configuration.

In an eighth aspect, alone or in combination with one or more of the first through seventh aspects, the RLC function is a reassembly function, and wherein the reassembly function is based at least in part on a first set of sequence numbers (SNs) associated with the first configuration and a second set of SNs associated with the second configuration.

In a ninth aspect, alone or in combination with one or more of the first through eighth aspects, process 800 includes transmitting a status report for an RLC PDU based at least in part on whether the RLC PDU is associated with a selected set of SNs of the first set of SNs or the second set of SNs, wherein the status report is specific to a configuration associated with the selected set of SNs, and wherein the status report is based at least in part on a poll message associated with the configuration or a reassembly timer associated with the configuration.

In a tenth aspect, alone or in combination with one or more of the first through ninth aspects, process 800 includes transmitting a status report for an RLC PDU received on the first carrier, wherein the status report indicates that a status for the second carrier is unavailable.

In an eleventh aspect, alone or in combination with one or more of the first through tenth aspects, the status report for the RLC PDU indicates a negative acknowledgment for the RLC PDU while a reassembly timer for the second carrier is active, wherein the status report indicates that the status for the second carrier is unavailable based at least in part on the reassembly timer for the second carrier being active, wherein the status report indicates an acknowledgment for all RLC PDUs received on the first carrier, and the method further comprises performing a reassembly function associated with the RLC PDU.

In a twelfth aspect, alone or in combination with one or more of the first through eleventh aspects, process 800 includes transmitting, after the reassembly timer has elapsed, another status report indicating a negative acknowledgment for the second carrier, wherein, if all RLC PDUs on the second carrier are successfully received, an acknowledgement for all RLC PDUs on the second carrier is transmitted based at least in part on a poll associated with the second carrier.

In a thirteenth aspect, alone or in combination with one or more of the first through twelfth aspects, the status report includes a field distinguishing whether the status report indicates a negative acknowledgment or a status being unavailable.

In a fourteenth aspect, alone or in combination with one or more of the first through thirteenth aspects, the status report indicates an acknowledgment for sequence numbers, associated with the second carrier, up to a sequence number that is unavailable.

In a fifteenth aspect, alone or in combination with one or more of the first through fourteenth aspects, process 800 includes transmitting a status report for an RLC PDU, wherein the status report includes, for at least one of the first carrier or the second carrier, one or more negative acknowledgments, one or more acknowledgments, and an indication that a status is unavailable.

In a sixteenth aspect, alone or in combination with one or more of the first through fifteenth aspects, the first configuration or the second configuration indicates at least one of: a duplexing configuration, a scheduling delay, a numerology, a frequency range, or an uplink/downlink slot allocation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
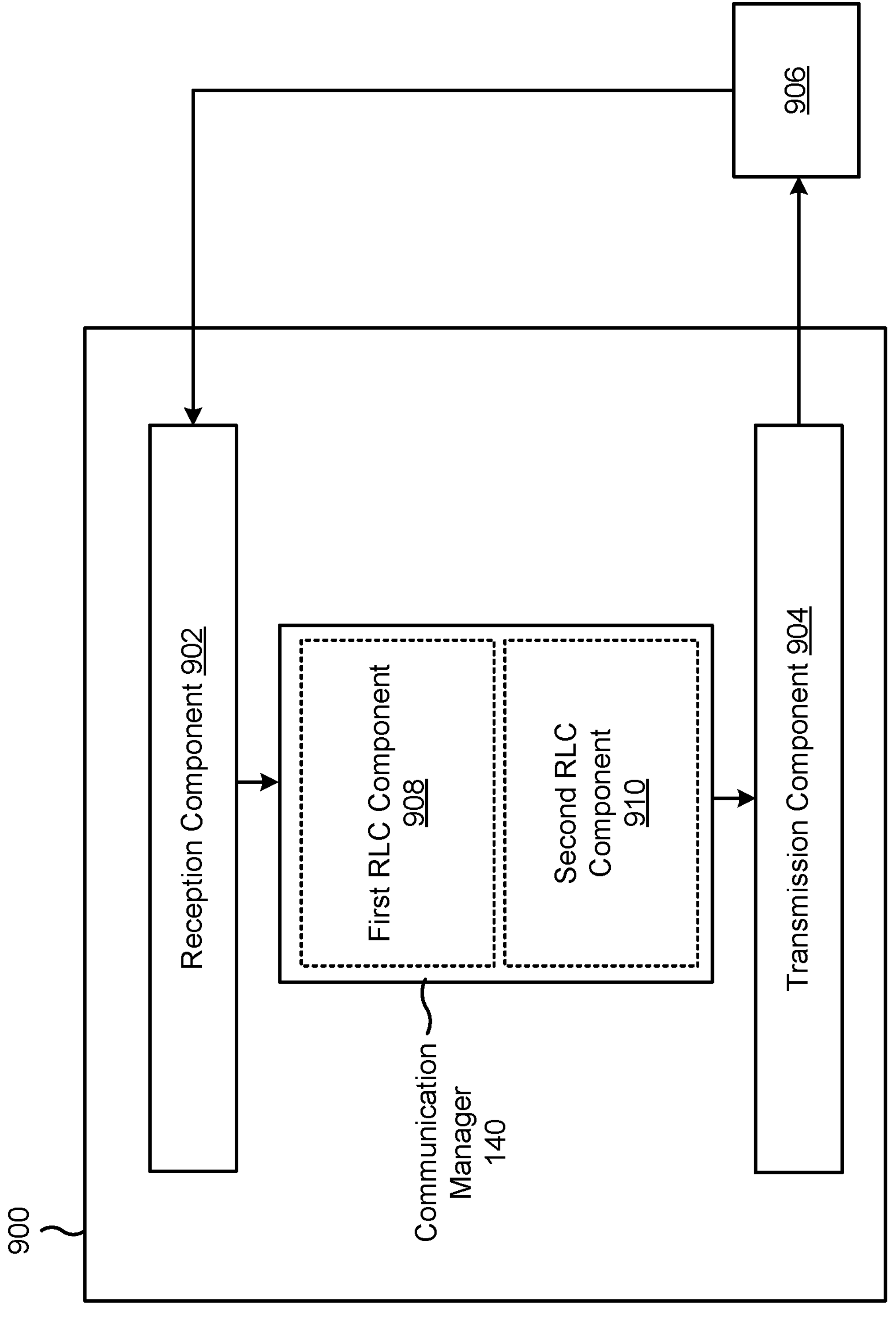
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a wireless communication device (e.g., a UE 120, a BS 110, a network node of a disaggregated BS), or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a first RLC component 908 or a second RLC component 910, among other examples.

In some aspects, the apparatus 900 may be configured to perform one or more operations described herein in connection with FIGS. 3-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the wireless communication device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the wireless communication device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the wireless communication device described in connection with FIG. 2. In some aspects, the transmission component 904 may be co-located with the reception component 902 in a transceiver.

The transmission component 904 may establish a first carrier of a CA configuration, wherein the first carrier is associated with a first configuration. The transmission component 904 may establish a second carrier of the CA configuration, wherein the second carrier is associated with a second configuration different than the first configuration. The reception component 902 may receive information indicating a first set of RLC parameters for the first configuration and a second set of RLC parameters for the second configuration. The first RLC component 908 may perform an RLC function for a first communication on the first carrier using the first set of RLC parameters. The second RLC component 910 may perform the RLC function for a second communication on the second carrier using the second set of RLC parameters.

The transmission component 904 may communicate a PDCP PDU on a selected RLC entity of the first RLC entity and the second RLC entity.

The transmission component 904 may transmit a status report for an RLC PDU based at least in part on whether the RLC PDU is associated with a selected set of SNs of the first set of SNs or the second set of SNs, wherein the status report is specific to a configuration associated with the selected set of SNs.

The transmission component 904 may transmit a status report for an RLC PDU received on the first carrier, wherein the status report indicates that a status for the second carrier is unavailable.

The transmission component 904 may transmit, during or after performing the reassembly function, another status report indicating a negative acknowledgment for the second carrier.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
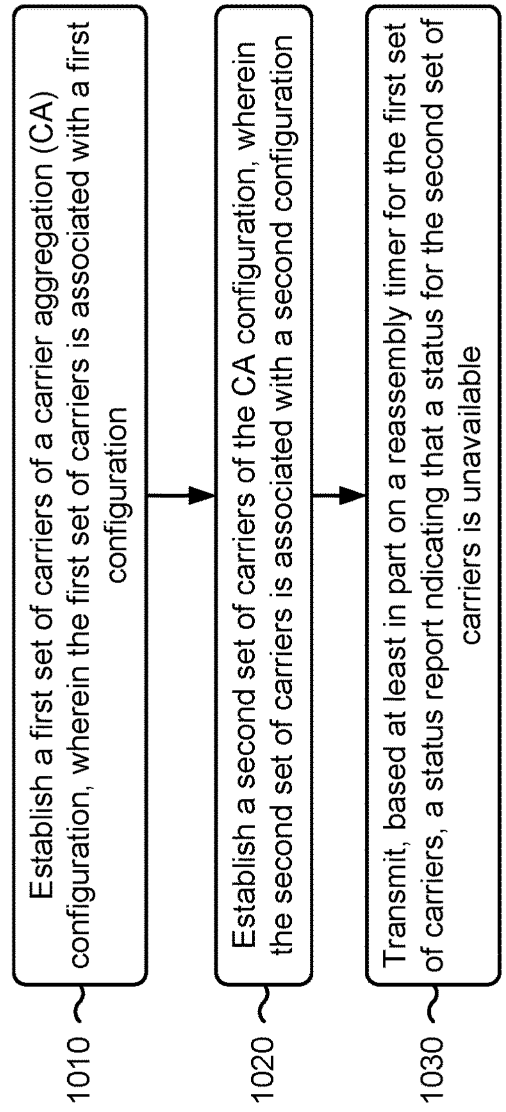
FIG. 10 is a diagram illustrating an example process performed, for example, by a wireless communication device, in accordance with the present disclosure.
Figure 10:

FIG. 10 is a diagram illustrating an example process 1000 performed, for example, by a wireless communication device, in accordance with the present disclosure. Example process 1000 is an example where the wireless communication device (e.g., UE 120, base station 110, a network node of a disaggregated base station) performs operations associated with radio link control for mixed numerology.

As shown in FIG. 10, in some aspects, process 1000 may include establishing a first set of carriers of a CA configuration, wherein the first set of carriers is associated with a first configuration (block 1010). For example, the wireless communication device (e.g., using communication manager 140 and/or transmission component 904, depicted in FIG. 9) may establish a first set of carriers of a CA configuration, wherein the first set of carriers is associated with a first configuration, as described above.

As further shown in FIG. 10, in some aspects, process 1000 may include establishing a second set of carriers of the CA configuration, wherein the second set of carriers is associated with a second configuration (block 1020). For example, the wireless communication device (e.g., using communication manager 140 and/or transmission component 904, depicted in FIG. 9) may establish a second set of carriers of the CA configuration, wherein the second set of carriers is associated with a second configuration, as described above.

As further shown in FIG. 10, in some aspects, process 1000 may include receiving an RLC PDU on the first set of carriers (block 1030). For example, the wireless communication device (e.g., using communication manager 140 and/or reception component 902, depicted in FIG. 9) may receive an RLC PDU on the first set of carriers, as described above.

As further shown in FIG. 10, in some aspects, process 1000 may include transmitting a status report for the RLC PDU indicating that a status for the second set of carriers is unavailable (block 1040). For example, the wireless communication device (e.g., using communication manager 140 and/or transmission component 904, depicted in FIG. 9) may transmit a status report for the RLC PDU indicating that a status for the second set of carriers is unavailable, as described above.

Process 1000 may include additional aspects, such as any single aspect or any combination of aspects described below and/or in connection with one or more other processes described elsewhere herein.

In a first aspect, the status report for the RLC PDU indicates a negative acknowledgment for the RLC PDU while a reassembly timer for the second set of carriers is active, wherein the status report indicates that the status for the second set of carriers is unavailable based at least in part on the reassembly timer for the second set of carriers being active, wherein the status report indicates an acknowledgment for all RLC PDUs received on the first set of carriers, and wherein the method further comprises performing a reassembly function associated with the RLC PDU.

In a second aspect, alone or in combination with the first aspect, process 1000 includes transmitting, after the reassembly timer has elapsed, another status report indicating a negative acknowledgment for the second set of carriers, wherein, if all RLC PDUs on the second set of carriers are successfully received, an acknowledgement for all RLC PDUs on the second set of carriers is transmitted based at least in part on a poll associated with the second set of carriers.

In a third aspect, alone or in combination with one or more of the first and second aspects, the status report includes a field distinguishing whether the status report indicates a negative acknowledgment or a status being unavailable.

In a fourth aspect, alone or in combination with one or more of the first through third aspects, the status report indicates an acknowledgment for all sequence numbers, associated with the second set of carriers, except sequence numbers that are unavailable or negatively acknowledged, up to a highest acknowledged sequence number.

In a fifth aspect, alone or in combination with one or more of the first through fourth aspects, the status report includes, for at least one of the first set of carriers or the second set of carriers, one or more negative acknowledgments, one or more acknowledgments, and an indication that a status is unavailable.

In a sixth aspect, alone or in combination with one or more of the first through fifth aspects, the first configuration or the second configuration indicates at least one of a duplexing configuration, a scheduling delay, a numerology, a frequency range, or an uplink/downlink slot allocation.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a wireless communication device, comprising: establishing a first carrier of a carrier aggregation (CA) configuration, wherein the first carrier is associated with a first configuration; establishing a second carrier of the CA configuration, wherein the second carrier is associated with a second configuration different than the first configuration; receiving information indicating a first set of radio link control (RLC) parameters for the first configuration and a second set of RLC parameters for the second configuration; performing an RLC function for a first communication on the first carrier using the first set of RLC parameters; and performing the RLC function for a second communication on the second carrier using the second set of RLC parameters.

Aspect 2: The method of Aspect 1, wherein establishing the first carrier comprises establishing a first RLC entity associated with the first configuration, and wherein establishing the second carrier comprises establishing a second RLC entity associated with the second configuration.

Aspect 3: The method of Aspect 2, wherein the RLC function is performed for the first communication by the first RLC entity and for the second communication by the second RLC entity.

Aspect 4: The method of Aspect 2, further comprising: communicating a packet data convergence protocol (PDCP) control protocol data unit (PDU) on a selected RLC entity of the first RLC entity and the second RLC entity.

Aspect 5: The method of any of Aspects 1-4, wherein the RLC function is performed in parallel for the first carrier and for the second carrier.

Aspect 6: The method of any of Aspects 1-5, wherein the first communication or the second communication is via at least one of a data radio bearer or a signaling radio bearer.

Aspect 7: The method of any of Aspects 1-6, wherein the RLC function is associated with one of an acknowledged mode or an unacknowledged mode.

Aspect 8: The method of any of Aspects 1-7, wherein the RLC function is based at least in part on an RLC protocol data unit (PDU), and wherein the RLC PDU includes a field indicating whether the RLC PDU is associated with the first configuration or the second configuration.

Aspect 9: The method of any of Aspects 1-8, wherein the RLC function is a reassembly function, and wherein the reassembly function is based at least in part on a first set of sequence numbers (SNs) associated with the first configuration and a second set of SNs associated with the second configuration.

Aspect 10: The method of Aspect 9, further comprising: transmitting a status report for an RLC protocol data unit (PDU) based at least in part on whether the RLC PDU is associated with a selected set of SNs of the first set of SNs or the second set of SNs, wherein the status report is specific to a configuration associated with the selected set of SNs, and wherein the status report is based at least in part on a poll message associated with the configuration or a reassembly timer associated with the configuration.

Aspect 11: The method of any of Aspects 1-10, further comprising: transmitting a status report for an RLC protocol data unit (PDU) received on the first carrier, wherein the status report indicates that a status for the second carrier is unavailable.

Aspect 12: The method of Aspect 11, wherein the status report for the RLC PDU indicates a negative acknowledgment for the RLC PDU while a reassembly timer for the second carrier is active, wherein the status report indicates that the status for the second carrier is unavailable based at least in part on the reassembly timer for the second carrier being active, wherein the status report indicates an acknowledgment for all RLC PDUs received on the first carrier, and wherein the method further comprises: performing a reassembly function associated with the RLC PDU.

Aspect 13: The method of Aspect 12, further comprising: transmitting, after the reassembly timer has elapsed, another status report indicating a negative acknowledgment for the second carrier, wherein, if all RLC PDUs on the second carrier are successfully received, an acknowledgement for all RLC PDUs on the second carrier is transmitted based at least in part on a poll associated with the second carrier.

Aspect 14: The method of Aspect 11, wherein the status report includes a field distinguishing whether the status report indicates a negative acknowledgment or a status being unavailable.

Aspect 15: The method of Aspect 11, wherein the status report indicates an acknowledgment for all sequence numbers, associated with the second carrier, except sequence numbers that are unavailable or negatively acknowledged, up to a highest acknowledged sequence number.

Aspect 16: The method of any of Aspects 1-15, further comprising: transmitting a status report for an RLC protocol data unit (PDU), wherein the status report includes, for at least one of the first carrier or the second carrier, one or more negative acknowledgments, one or more acknowledgments, and an indication that a status is unavailable.

Aspect 17: The method of any of Aspects 1-16, wherein the first configuration or the second configuration indicates at least one of: a duplexing configuration, a scheduling delay, a numerology, a frequency range, or an uplink/downlink slot allocation.

Aspect 18: A method of wireless communication performed by a wireless communication device, comprising: establishing a first set of carriers of a carrier aggregation (CA) configuration, wherein the first set of carriers is associated with a first configuration; establishing a second set of carriers of the CA configuration, wherein the second set of carriers is associated with a second configuration; receiving information indicating a first set of radio link control (RLC) parameters for the first configuration and a second set of RLC parameters for the second configuration; performing an RLC function for a first communication on the first set of carriers using the first set of RLC parameters; and performing the RLC function for a second communication on the second set of carriers using the second set of RLC parameters, wherein the first communication and the second communication are associated with a radio bearer.

Aspect 19: The method of Aspect 18, further comprising performing a PDCP function for the first communication and the second communication.

Aspect 20: The method of Aspect 19, wherein the PDCP function for the first communication and the second communication is performed by a single PDCP entity.

Aspect 21: The method of any of Aspects 18-20, wherein establishing the first set of carriers comprises establishing a first RLC entity associated with the first configuration, and wherein establishing the second set of carriers comprises establishing a second RLC entity associated with the second configuration.

Aspect 22: The method of Aspect 21, wherein the RLC function is performed for the first communication by the first RLC entity and for the second communication by the second RLC entity.

Aspect 23: The method of Aspect 21, further comprising: communicating a packet data convergence protocol (PDCP) control protocol data unit (PDU) on a selected RLC entity of the first RLC entity and the second RLC entity.

Aspect 24: The method of any of Aspects 18-23, wherein traffic of the first communication or the second communication is split between the first RLC entity and the second RLC entity.

Aspect 25: The method of any of Aspects 18-24, wherein the RLC function is performed in parallel for the first set of carriers and for the second set of carriers.

Aspect 26: The method of any of Aspects 18-25, wherein the first communication or the second communication is via the radio bearer, wherein the radio bearer is at least one of a data radio bearer or a signaling radio bearer.

Aspect 27: The method of Aspect 26, wherein the first communication and the second communication are via the radio bearer.

Aspect 28: The method of any of Aspects 18-27, wherein the RLC function is associated with one of an acknowledged mode or an unacknowledged mode.

Aspect 29: The method of any of Aspects 18-28, wherein the RLC function is based at least in part on an RLC protocol data unit (PDU), and wherein the RLC PDU includes a field indicating whether the RLC PDU is associated with the first configuration or the second configuration.

Aspect 30: The method of any of Aspects 18-29, wherein the RLC function is a reassembly function, and wherein the reassembly function is based at least in part on a first set of sequence numbers (SNs) associated with the first configuration and a second set of SNs associated with the second configuration.

Aspect 31: The method of Aspect 30, further comprising: transmitting a status report for an RLC protocol data unit (PDU) based at least in part on whether the RLC PDU is associated with a selected set of SNs of the first set of SNs or the second set of SNs, wherein the status report is specific to a configuration associated with the selected set of SNs, and wherein the status report is based at least in part on a poll message associated with the configuration or a reassembly timer associated with the configuration.

Aspect 32: The method of any of Aspects 18-31, further comprising: transmitting a status report for an RLC protocol data unit (PDU) received on the first set of carriers, wherein the status report indicates that a status for the second set of carriers is unavailable.

Aspect 33: The method of Aspect 32, wherein the status report for the RLC PDU indicates a negative acknowledgment for the RLC PDU while a reassembly timer for the second set of carriers is active, wherein the status report indicates that the status for the second set of carriers is unavailable based at least in part on the reassembly timer for the second set of carriers being active, wherein the status report indicates an acknowledgment for all RLC PDUs received on the first set of carriers, and wherein the method further comprises: performing a reassembly function associated with the RLC PDU.

Aspect 34: The method of Aspect 33, further comprising: transmitting, after the reassembly timer has elapsed, another status report indicating a negative acknowledgment for the second set of carriers, wherein, if all RLC PDUs on the second set of carriers are successfully received, an acknowledgement for all RLC PDUs on the second set of carriers is transmitted based at least in part on a poll associated with the second set of carriers.

Aspect 35: The method of Aspect 33, wherein the status report includes a field distinguishing whether the status report indicates a negative acknowledgment or a status being unavailable.

Aspect 36: The method of Aspect 33, wherein the status report indicates an acknowledgment for all sequence numbers, associated with the second set of carriers, except sequence numbers that are unavailable or negatively acknowledged, up to a highest acknowledged sequence number.

Aspect 37: The method of any of Aspects 18-36, further comprising: transmitting a status report for an RLC protocol data unit (PDU), wherein the status report includes, for at least one of the first set of carriers or the second set of carriers, one or more negative acknowledgments, one or more acknowledgments, and an indication that a status is unavailable.

Aspect 38: The method of any of Aspects 18-36, wherein the first configuration or the second configuration indicates at least one of: a duplexing configuration, a scheduling delay, a numerology, a frequency range, or an uplink/downlink slot allocation.

Aspect 39: The method of any of Aspects 18-38, wherein the method further comprises: establishing a third set of carriers of the CA configuration, wherein the third set of carriers is associated with a third configuration; and performing the RLC function for a third communication on the third set of carriers using a third set of RLC parameters, wherein the third communication is associated with the radio bearer.

Aspect 40: A method of wireless communication performed by a user equipment (UE), comprising: establishing a first set of carriers of a carrier aggregation (CA) configuration, wherein the first set of carriers is associated with a first configuration; establishing a second set of carriers of the CA configuration, wherein the second set of carriers is associated with a second configuration; receiving an RLC protocol data unit (PDU) received on the first set of carriers; and transmitting a status report for the RLC PDU indicating that a status for the second set of carriers is unavailable.

Aspect 41: The method of Aspect 40, wherein the status report for the RLC PDU indicates a negative acknowledgment for the RLC PDU while a reassembly timer for the second set of carriers is active, wherein the status report indicates that the status for the second set of carriers is unavailable based at least in part on the reassembly timer for the second set of carriers being active, wherein the status report indicates an acknowledgment for all RLC PDUs received on the first set of carriers, and wherein the method further comprises: performing a reassembly function associated with the RLC PDU.

Aspect 42: The method of Aspect 41, further comprising: transmitting, after the reassembly timer has elapsed, another status report indicating a negative acknowledgment for the second set of carriers, wherein, if all RLC PDUs on the second set of carriers are successfully received, an acknowledgement for all RLC PDUs on the second set of carriers is transmitted based at least in part on a poll associated with the second set of carriers.

Aspect 43: The method of any of Aspects 40-42, wherein the status report includes a field distinguishing whether the status report indicates a negative acknowledgment or a status being unavailable.

Aspect 44: The method of any of Aspects 40-43, wherein the status report indicates an acknowledgment for all sequence numbers, associated with the second set of carriers, except sequence numbers that are unavailable or negatively acknowledged, up to a highest acknowledged sequence number.

Aspect 45: The method of any of Aspects 40-44, wherein the status report includes, for at least one of the first set of carriers or the second set of carriers, one or more negative acknowledgments, one or more acknowledgments, and an indication that a status is unavailable.

Aspect 46: The method of any of Aspects 40-45, wherein the first configuration or the second configuration indicates at least one of: a duplexing configuration, a scheduling delay, a numerology, a frequency range, or an uplink/downlink slot allocation.

Aspect 47: An apparatus for wireless communication at a device, comprising a processor; memory coupled with the processor; and instructions stored in the memory and executable by the processor to cause the apparatus to perform the method of one or more of Aspects 1-46.

Aspect 48: A device for wireless communication, comprising a memory and one or more processors coupled to the memory, the one or more processors configured to perform the method of one or more of Aspects 1-46.

Aspect 49: An apparatus for wireless communication, comprising at least one means for performing the method of one or more of Aspects 1-46.

Aspect 50: A non-transitory computer-readable medium storing code for wireless communication, the code comprising instructions executable by a processor to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:

one or more memories; and one or more processors, coupled to the one or more memories, configured to:

establish a first set of carriers of a carrier aggregation (CA) configuration, wherein the first set of carriers is associated with a first configuration;

establish a second set of carriers of the CA configuration, wherein the second set of carriers is associated with a second configuration;

receive information indicating a first set of radio link control (RLC) parameters for the first configuration and a second set of RLC parameters for the second configuration;

perform a first RLC function for a first communication on the first set of carriers, using the first set of RLC parameters, wherein the first RLC function is a first reassembly function based at least in part on a first subset of sequence numbers (SNs) of a set of SNs, and wherein the first subset of SNs is associated with the first configuration;

perform a second RLC function for a second communication on the second set of carriers, using the second set of RLC parameters, wherein the second RLC function is a second reassembly function based at least in part on a second subset of SNs of the set of SNs, and wherein the second subset of SNs is associated with the second configuration;

initiate an RLC protocol data unit (PDU) recovery process for the first set of carriers, while a reassembly timer for the second set of carriers runs, based on a determination that a reassembly timer for the first set of carriers has expired and the reassembly timer for the second set of carriers has not elapsed, and in response to transmission of a status report that:

indicates a negative acknowledgment for the first set of carriers, and indicates an unavailable status for the second set of carriers.

2. The wireless communication device of claim 1, wherein the one or more processors are further configured to perform a PDCP function for the first communication and the second communication.

3. The wireless communication device of claim 2, wherein the PDCP function for the first communication and the second communication is associated with by a single PDCP entity.

4. The wireless communication device of claim 1, wherein the one or more processors, to establish the first set of carriers, are configured to establish a first RLC entity associated with the first configuration, and wherein the one or more processors, to establish the second set of carriers, are configured to establish a second RLC entity associated with the second configuration.

5. The wireless communication device of claim 4, wherein the first RLC function for the first communication is associated with a first RLC entity and the second RLC function for the second communication is associated with the second RLC entity.

6. The wireless communication device of claim 4, wherein the one or more processors are further configured to:

communicate a packet data convergence protocol (PDCP) control PDU on a selected RLC entity of the first RLC entity and the second RLC entity.

7. The wireless communication device of claim 4, wherein traffic of the first communication or the second communication is configured to be split between the first RLC entity and the second RLC entity.

8. The wireless communication device of claim 1, wherein the RLC function is in parallel for the first set of carriers and for the second set of carriers.

9. The wireless communication device of claim 1, wherein the first communication or the second communication is via a radio bearer, wherein the radio bearer is at least one of a data radio bearer or a signaling radio bearer.

10. The wireless communication device of claim 9, wherein the first communication and the second communication are via the radio bearer.

11. The wireless communication device of claim 9, wherein the one or more processors are further configured to:

establish a third set of carriers of the CA configuration, wherein the third set of carriers is associated with a third configuration; and perform a third RLC function for a third communication on the third set of carriers using a third set of RLC parameters, wherein the third communication is associated with the radio bearer.

12. The wireless communication device of claim 1, wherein the first RLC function and the second RLC function are associated with one of an acknowledged mode or an unacknowledged mode.

13. The wireless communication device of claim 1, wherein the first RLC function is based at least in part on an RLC PDU, and wherein the RLC PDU includes a field indicating whether the RLC PDU is associated with the first configuration.

14. The wireless communication device of claim 1, wherein the one or more processors are further configured to:

transmit a status report for an RLC PDU based at least in part on whether the RLC PDU is associated with a selected subset of SNs of the first subset of SNs or the second subset of SNs, wherein the status report is specific to a configuration associated with the selected subset of SNs, and wherein the status report is based at least in part on a poll message associated with the configuration or a reassembly timer associated with the configuration.

15. The wireless communication device of claim 1, wherein the one or more processors are further configured to:

transmit a status report for an RLC PDU received on the first set of carriers, wherein the status report indicates that a status for the second set of carriers is unavailable.

16. The wireless communication device of claim 15, wherein the status report for the RLC PDU indicates a negative acknowledgment for the RLC PDU while a reassembly timer for the second set of carriers is active, wherein the status report indicates that the status for the second set of carriers is unavailable based at least in part on the reassembly timer for the second set of carriers being active, wherein the status report indicates an acknowledgment for all RLC PDUs received on the first set of carriers, and wherein the one or more processors are further configured to:

perform a reassembly function associated with the RLC PDU.

17. The wireless communication device of claim 16, wherein the one or more processors are further configured to:

transmit, after the reassembly timer has elapsed, another status report indicating a negative acknowledgment for the second set of carriers, wherein, if all RLC PDUs on the second set of carriers are successfully received, an acknowledgement for all RLC PDUs on the second set of carriers is configured to be transmitted based at least in part on a poll associated with the second set of carriers.

18. The wireless communication device of claim 15, wherein the status report includes a first field that indicates whether a negative acknowledgment field is included in the status report, and further includes a fourth field that indicates whether a second field and a third field in the status report are associated with the negative acknowledgment or with the unavailable status indication.

19. The wireless communication device of claim 15, wherein the status report indicates an acknowledgment for all sequence numbers, associated with the second set of carriers, except sequence numbers that are unavailable or negatively acknowledged, up to a highest acknowledged sequence number.

20. The wireless communication device of claim 1, wherein the one or more processors are further configured to:

transmit a status report for an RLC PDU, wherein the status report includes, for at least one of the first set of carriers or the second set of carriers, one or more negative acknowledgments, one or more acknowledgments, and an indication that a status is unavailable.

21. The wireless communication device of claim 1, wherein the first configuration or the second configuration indicates at least one of:

a duplexing configuration,
a scheduling delay,
a numerology,
a frequency range, or
an uplink/downlink slot allocation.

22. A user equipment (UE) for wireless communication, comprising:

a memory; and one or more processors, coupled to the memory, configured to:

establish a first set of carriers of a carrier aggregation (CA) configuration, wherein the first set of carriers is associated with a first configuration and a first subset of sequence numbers (SNs) of a set of SNs;

establish a second set of carriers of the CA configuration, wherein the second set of carriers is associated with a second configuration and a second subset of SNs of the set of SNs;

transmit, based at least in part on a reassembly timer of the first set of carriers, a status report, wherein the status report indicates a negative acknowledgment for the first set of carriers based at least in part on expiry of the reassembly timer for the first set of carriers while a reassembly timer for the second set of carriers has not elapsed, and wherein the status report indicates an unavailable status for the second set of carriers based at least in part on the reassembly timer for the second set of carriers having not elapsed; and initiate an RLC PDU recovery process for the first set of carriers while the reassembly timer for the second set of carriers has not elapsed.

23. The UE of claim 22, wherein the one or more processors are further configured to:

transmit, after the reassembly timer for the second set of carriers has elapsed, another status report indicating a negative acknowledgment for the second set of carriers based at least in part on failing to receive one or more RLC PDUs on the second set of carriers within the reassembly timer for the second set of carriers, wherein, if all RLC PDUs on the second set of carriers are successfully received, an acknowledgement for all RLC PDUs on the second set of carriers is configured to be transmitted based at least in part on a poll associated with the second set of carriers.

24. The UE of claim 22, wherein the status report includes a field distinguishing whether the status report indicates a negative acknowledgment or a status being unavailable.

25. The UE of claim 22, wherein the status report indicates an acknowledgment for all sequence numbers of the second subset of SNs, associated with the second set of carriers, except sequence numbers that are unavailable or negatively acknowledged, up to a highest acknowledged sequence number.

26. The UE of claim 22, wherein the status report includes, for at least one of the first set of carriers or the second set of carriers, one or more negative acknowledgments, one or more acknowledgments, and an indication that a status is unavailable.

27. A method of wireless communication performed by a wireless communication device, comprising:

establishing a first set of carriers of a carrier aggregation (CA) configuration, wherein the first set of carriers is associated with a first configuration;

establishing a second set of carriers of the CA configuration, wherein the second set of carriers is associated with a second configuration;

receiving information indicating a first set of radio link control (RLC) parameters for the first configuration and a second set of RLC parameters for the second configuration;

performing a first RLC function for a first communication on the first set of carriers using the first set of RLC parameters, wherein the first RLC function is a first reassembly function based at least in part on a first subset of sequence numbers (SNs) of a set of SNs, and wherein the first subset of SNs is associated with the first configuration;

performing a second RLC function for a second communication on the second set of carriers using the second set of RLC parameters, wherein the second RLC function is a second reassembly function based at least in part on a second subset of SNs of the set of SNs, and wherein the second subset of SNs is associated with the second configuration; and initiating an RLC protocol data unit (PDU) recovery process for the first set of carriers, while a reassembly timer for the second set of carriers runs, based on based on a determination that a reassembly timer for the first set of carriers has expired and the reassembly timer for the second set of carriers has not elapsed, and in response to transmitting a status report that:

indicates a negative acknowledgment for the first set of carriers, and indicates an unavailable status for the second set of carriers.

28. A method of wireless communication performed by a user equipment (UE), comprising:

establishing a first set of carriers of a carrier aggregation (CA) configuration, wherein the first set of carriers is associated with a first configuration and a first subset of sequence numbers (SNs) of a set of SNs;

establishing a second set of carriers of the CA configuration, wherein the second set of carriers is associated with a second configuration and a second subset of SNs of the set of SNs;

transmitting, based at least in part on a reassembly timer of the first set of carriers, a status report, wherein the status report indicates a negative acknowledgment for the first set of carriers based at least in part on expiry of the reassembly timer for the first set of carriers while a reassembly timer for the second set of carriers has not elapsed, and wherein the status report indicates an unavailable status for the second set of carriers based at least in part on the reassembly timer for the second set of carriers having not elapsed; and initiating an RLC PDU recovery process for the first set of carriers while the reassembly timer for the second set of carriers runs.

29. The method of claim 28, wherein the status report includes a first field that indicates whether a negative acknowledgment field is included in the status report, and further includes a fourth field that indicates whether a second field and a third field in the status report are associated with the negative acknowledgment or with the unavailable status indication.

30. The method of claim 29, wherein the negative acknowledgment field identifies a SN from the first subset of SNs corresponding to a missing RLC PDU, wherein the second field indicates whether a segment offset field is included in the status report, and wherein the third field indicates a number of consecutive RLC data units that were not received, beginning from the SN identified by the negative acknowledgment field.

* * * * *